United States Patent [19]

Krepak

[11] Patent Number: 4,735,722

[45] Date of Patent: Apr. 5, 1988

[54] DESALINATION OF SEAWATER OR BRACKISH WATER

[76] Inventor: John C. Krepak, 1024 Prospect St., Shreveport, La. 71104

[21] Appl. No.: 62,057

[22] Filed: Jun. 15, 1987

[51] Int. Cl.$^4$ .............................................. B01D 13/01
[52] U.S. Cl. ........................... 210/500.23; 210/500.27
[58] Field of Search ............... 210/634, 642, 636, 644, 210/643, 649, 650, 651, 500.1, 500.21, 500.23, 500.27

[56] References Cited

U.S. PATENT DOCUMENTS 3,236,768  2/1966  Litt ...................................... 210/636
3,702,820  11/1972  Hough .................................. 210/644

Primary Examiner—Frank Sever

[57] ABSTRACT

This invention deals with the problem of extracting potentially potable relatively salt-free water from seawater or brackish well water in areas where little or no power supplies exist. The object is to draw such water through a special filter that permits the passage of the water while leaving the salt behind, enough so that the remaining small amount of salinity is considered not objectionable for drinking purposes. This invention would have great potential as stand-by equipment in the after-math of coastal typhoons and hurricanes, when all power is lost, and water supplies are contaminated by flood tides from the sea. It would also have an application to remove most of the radio-active salts or residue left over from a nuclear accident or explosion that would contaminate water supplies.

This invention would have great application in emergency situations at sea. It could provide emergency water to disabled yachts, boats, liferafts, offshore installations and to military personnel stranded in areas where it would not be prudent to use noisy power supplies. Farmers can use this invention in remote fields to keep stock ponds and drip-irrigation systems supplied. Islands surrounded by seawater and without large water-shed and storage areas can supplement their water supplies. Many an abandoned oil well, now flooded with salt-water can become a source of salt-free water with this invention, without having to drill disposal wells for the salt.

The long-range sun cycle with its sun-spots indicate that an intense drought is in the offing by 1990. States like Texas and California have been trying to beg, borrow or steal water from neighboring states. The present flash-distillation systems like those in Freeport, Texas produce costs of $7.00 to $8.00 per thousand gallons . . . too expensive . . . even for drip-irrigation. A battery of these standpipes with their discharge ends manifolded together could fill a two to three foot diameter pipeline flowing ashore for distribution to various impoundments. Cities like New York, Los Angeles, London, etc., etc., could use this invention to maintain their reservoir levels during periods of scanty rainfall. The predicted sunspot cycle and the accompanying drought should provide much incentive for the use of this invention. Coastal African villages, without power supplies might survive with this invention to help augment water supplies.

1 Claim, 1 Drawing Sheet

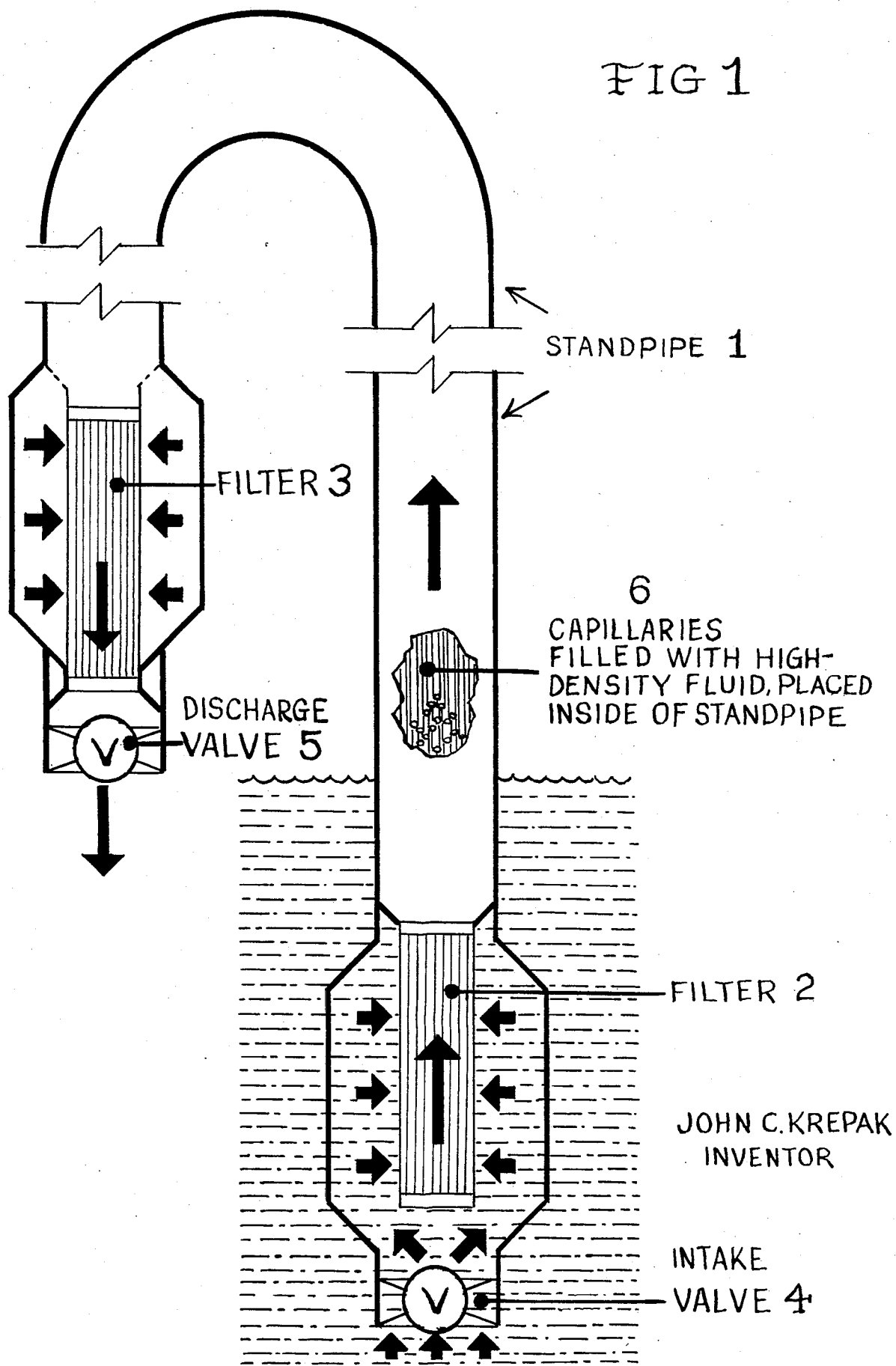

DESALINATION OF SEAWATER OR BRACKISH WATER

The design of this invention s to make use of known principles in physics. First, OSMOSIS . . . permits fluid from a less dense liquid to pass through a semi-permeable membrane into a more dense liquid on the other side of the membrane.

Second, CAPILLARY ACTION. . . The weight of the atmosphere at sea-level, 14.7 lbs per sq. inch, will support a column of mercury in a capillary tube to a height of 30 inches plus. The same atmosphere will support a column of water in a capillary tube to a height of 20 to 33 feet.

Third, GRAVITY . . . is brought into play in the final stage through the discharge valve in the system...as will be explained in the drawing and accompaning description of this invention.

FIG. 1 shows the best mode of the invention.

The invention is comprised of a standpipe FIG. 1, in which the standpipe (1) is a long tubing, one end of which is bent into a 180 degree turn to which a shorter straight section with filter (3), and a discharge valve (5) are attached. The longer end of this standpipe (1) is a long enough so that when the standpipe (1) is mounted in a vertical position on an offshore platform, the discharge valve (5) is high enough above the water level to permit a gravity assisted flow of relatively salt-free water through the discharge valve (5).

The inside of the standpipe (1) is filled with rigid-wall capillaries (6) bunched together so that even the spaces left between the capillaries (6) serve as capillaries.

The intake valve (4) and the discharge valve (5) are there to serve as closures to maintain the integrity of filter (2) and filter (3) by maintaining both filters in a water environment.

The capillaries (6) are then filled with a high-density fluid that will not cause detriment to the quality of the water being desalinated. One such fluid can be water, super-saturated with refined sugar with a molecular weight of 342. This refined sugar is six time the molecular weight of the salt in seawater with a molecular weight of 57. In this invention the filter(2) serves to keep most of the salt from entering the sugar-laden capillaries (6) in the standpipe (1), but permits the water to be drawn into the system by the combined efforts of osmosis and capillary action.

As the desalinated water enter the standpipe(1) the sugar-laden capillaries (6) provide a combined effort to bring the desalinated water above sea level and over the 180 degree curve . . . down into filter (3). This filter serves to keep the high-density fluids within the capillaries (6), inside the standpipe (1).

At this point, desalinated and desugared water is present at the discharge valve(5). This desalination system would be delivered to the installation area with both the intake valve (4), and the discharge valve (5) closed to retain the high-density fluids within the capillaries (6) and the water-baths necessary to protect the filters (2) and (3).

The intake valve (4) would be opened after the standpipe (1) is installed in its working position. For example if the intake valve (4) is located below 60 feet from the sea-level surface, the pressure would be in excess of 3,000 psi at the intake valve (4) assuring penetration by the water through the intake filter (2), leaving most of the salt behind. The position of the discharge filter (3) and the discharge valve (5) would be above sea-level. The length of the discharge side of the standpipe (1) and the height of the discharge valve (5) above sea-level would determine how much gravity would assist the combined efforts of osmosis and capillary action. Once the discharge valve (5) is opened, potentially potable water minus the salt and the sugar would be available. A large screened enclosure would surround the intake valve (4) to prevent marine life from clogging the unit.

This system would create a water source that mimics the action of an artesian well. This invention would provide relatively salt-free water, flowing 24 hrs a day without the use of an external power source. When this invention is used with a power source, it would reduce the amount of energy normally required to bring the water to the surface.

Other uses for this invention will become apparent. The ability to lift other fluids will be made use of claimed in other patent applications.

For this invention I claim:

1. Means for recovering potable water from an aqueous feed having first disolved components, comprising:
   A standpipe including an inlet leg, a bend and an outlet leg;
   a first filter positioned in the lower end of said inlet leg;
   means providing an alternative to external power including a plurality of capillary tubes positioned within said inlet leg between said bend and said first filter and a fluid within said capillary tubes having second disolved components of a greater density than said first components; and,
   a second filter positioned in the lower end of said second leg.

* * * * *